US00RE47498E

(19) United States
(12) Reissued Patent
Niederriter et al.

(10) Patent Number: US RE47,498 E
(45) Date of Reissued Patent: Jul. 9, 2019

(54) METHOD FOR STEERING A MINING MACHINE CUTTER

(71) Applicant: Joy MM Delaware, Inc., Wilmington, DE (US)

(72) Inventors: Edward F. Niederriter, Fryburg, PA (US); Gregory S. Wilson, Oil City, PA (US)

(73) Assignee: Joy Global Underground Mining LLC, Warrendale, PA (US)

(21) Appl. No.: 14/255,043

(22) Filed: Apr. 17, 2014

Related U.S. Patent Documents

Reissue of:
(64) Patent No.: 8,157,331
Issued: Apr. 17, 2012
Appl. No.: 12/619,166
Filed: Nov. 16, 2009

(51) Int. Cl.
*E21C 35/24* (2006.01)

(52) U.S. Cl.
CPC ..... *E21C 35/24* (2013.01)

(58) Field of Classification Search
CPC ..... H04J 1/00; H04J 1/02; E21C 35/24
USPC ..... 299/1.6
See application file for complete search history.

(56) References Cited

U.S. PATENT DOCUMENTS

| | | | | |
|---|---|---|---|---|
| 3,371,964 | A | 3/1968 | Weber | |
| 3,817,578 | A | 6/1974 | Wilson | |
| 4,130,319 | A | 12/1978 | Gapper | |
| 4,371,209 | A | 2/1983 | Alford et al. | |
| 4,822,105 | A | 4/1989 | Yamada et al. | |
| 4,976,495 | A | 12/1990 | Lewins et al. | |
| 5,116,103 | A | 5/1992 | Lewins et al. | |
| 5,228,751 | A * | 7/1993 | Ramsden, Jr. | 299/1.6 |
| 6,666,521 | B1 * | 12/2003 | Pease et al. | 299/1.1 |
| 7,005,576 | B2 | 2/2006 | Niederriter et al. | |
| 2002/0166973 | A1 | 11/2002 | Frederick et al. | |

FOREIGN PATENT DOCUMENTS

| | | |
|---|---|---|
| AU | 7896687 | 3/1988 |
| CN | 101050703 | 10/2007 |
| CN | 101975061 | 2/2011 |

(Continued)

OTHER PUBLICATIONS

Notification of First Office Action with English translation from The State Intellectual Property Office of the People's Republic of China for Chinese Application No. 201010551160.7 dated Nov. 25, 2013 (14 pages).

(Continued)

*Primary Examiner* — William C Doerrler
(74) *Attorney, Agent, or Firm* — Michael Best & Friedrich LLP

(57) ABSTRACT

A control system monitors the angle of each ranging arm, with respect to the mainframe of the machine. While the machine is in a defined zone along the face, if the angle of the arm is detected to be lower than a parameter defined set-point called the undercut limit, the control system does not allow the arm to be lowered further. When entering the run of face from either gate end, if either of the ranging arms are below the set point, the horizontal movement of the shearer is stopped, and an alarm message is generated, and a warning light begins to flash, alerting the operator that he must raise the arm before horizontal movement of the shearer can be enabled.

6 Claims, 6 Drawing Sheets

(56) References Cited

FOREIGN PATENT DOCUMENTS

| | | | |
|---|---|---|---|
| GB | 2027548 | | 2/1980 |
| GB | 2190939 | A | 12/1987 |
| SU | 1439235 | | 11/1988 |
| WO | 2006036764 | A2 | 4/2006 |

OTHER PUBLICATIONS

United States Patent Office Action for U.S. Appl. No. 12/619,166, dated Jul. 22, 2011 (6 pages).
United States Patent Office Notice of Allowance for U.S. Appl. No. 12/619,166 dated Dec. 13, 2011 (5 pages).
Australian Patent Examination Report for Australian Application No. 2010241394 dated Apr. 4, 2014 (3 pages).
Office Action from the Patent Office of the Russian Federation for Application No. 2010146304 dated Nov. 20, 2014 (11 pages).
Extended European Search Report from the European Patent Office for Application No. 10190872.1 dated May 8, 2015 (8 pages).
European Examination Report from the European Patent Office for Application No. 10 190 872.1 dated Mar. 21, 2016 (5 pages).

* cited by examiner

METHOD FOR STEERING A MINING MACHINE CUTTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of U.S. patent application Ser. No. 12/619,166, filed Nov. 16, 2009, now U.S. Pat. No. 8,157,331, the entire contents of which are incorporated herein by reference.*

BACKGROUND

This disclosure relates to a method of steering a mining machine cutter in which the mining machine is of the kind having a body arranged to be progressed along a mineral face being cut, the body having at either end a ranging arm pivotally mounted on the body and each arm carrying a rotatable cutting drum. This kind of machine is known as a double-ended ranging drum shearer.

Many means of cutting and extracting wanted mineral are known, but one commonly used form, particularly for winning coal, is to use a ranging drum machine having ranging arms at either end, where a cutting drum having a plurality of cutting picks is rotated at the end of each ranging arm, which is pivotally secured to the body of a machine. The body of the machine is moved along a face, and each rotating drum cuts material from the face.

This type of machine is steered to enable the drum always to cut within the mine face seam by adjusting the pivotal control of the ranging arms. Skilled operators who watch the progress of the drum and the seam can do this manually, but automatic means can also be used since the creation of dust and water sprays can impair the vision of the drum by the operators.

Such a machine carries a plurality of sensors mounted on the machine, the sensors being adapted to measure different parameters of the mining operation and to generate electrical signals representative of said parameters. For example, some of the sensors may be arranged to measure along the face, the pitch or roll of the machine, other sensors may be arranged to measure the movement and direction of the machine, and still other of the sensors may be arranged to measure the positions of the leading and trailing ranging arms with respect to the machine. When steering the cutting machine, it is important to make sure the machine does not wander into strata on either side of the mine face seam. In order to do this, it is normal to leave a few inches of the material being cut to form a roof and floor so that any minor variations in the path of the cutting machine only varies the thickness of the roof and floor left and does not cut into the adjoining strata.

The gate ends of a longwall face are typically higher above the mine floor than the rest of the mine face, for the conveyor bed must go up over the conveyor drives at the gate ends of the mine face. This results in the shearer being raised up at the gate ends. As a result, the shearer operator must pivot the ranging arm lower at the gate ends in order to still effectively mine the coal from the mine face.

A problem can arise where an operator leaves the ranging arm in the lowered position, and attempts to leave the gate end area. If this happens, then the ranging arm is below the undercut limit, and the cutting machine may cut into the mine floor, resulting in possible damage to the machine.

SUMMARY

It is an object of this disclosure to provide an improved method of steering the trailing drum of a mining machine in order to help reduce the likelihood of an operator undercutting material beneath the mine face.

It is also an object of this disclosure to limit the amount of undercutting on the face at other than the ends (called gate, such as head gate and tail gate, ends) of the mine face, hereinafter the run of face, while still allowing full undercut in the gate ends.

A control system monitors the angle of each ranging arm, with respect to the mainframe of the machine. While the machine is in a defined zone along the face, if the angle of the arm is commanded by the operator to be lower than a parameter defined set point called the undercut limit, the control system does not allow the arm to be lowered further. When entering the run of face from either gate end, if either of the ranging arms are below the set point, the horizontal movement of the shearer is stopped, and an alarm message is generated, and a warning light begins to flash, alerting the operator that he must raise the arm before horizontal movement of the shearer can be enabled.

The machine includes ranging arm inclinometers, pitch and roll sensor, and d-gear sensors.

Figure 1:
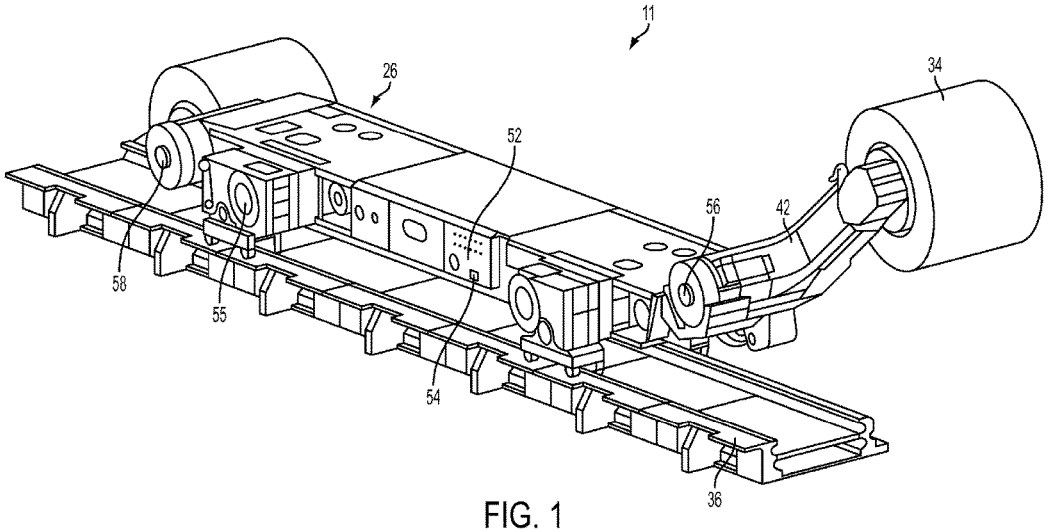
FIG. 1 is a perspective view of a cutting machine known as a longwall shearer, shown traveling along an armored face conveyor.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Illustrated in FIG. 1 is one type of coal mining apparatus 11 that comprises a mobile mining or cutting machine 26 in the form of a shearer 26 that has a rotatable cutting or mining head 34 that is equipped with a plurality of cutting bits 38 adapted to dislodge coal from a seam (not shown). The cutting head 34 is attached to a movable boom arrangement 42 (also called a ranging arm) that enables the position of the cutting head 34 to be adjusted relative to the mine floor. As the cutting head 34 is rotated and advanced into the seam, the coal is dislodged from the mine face and is received on gathering and conveying apparatuses 36 of coal mining apparatus 11. The conveying apparatus 36 discharges the mined material onto a separate freestanding or mobile conveying apparatus (not shown) for eventual transfer out of the mine. The leading cutting head 34 cuts the top portion of the seam and the trailing cutting head extracts the remainder. The cutting machine is hauled along an armored conveyor in a conventional manner as it cuts.

In some instances, an operator (not shown) manually moves the shearer along the mine face 60 (see FIG. 3), and controls the position of the ranging arms 42. The operator interacts with the machine by which providing operator input to a machine controller or control system 52. The machine controller 52, after interacting with an undercut protection program 64 (see FIG. 4), then causes machine horizontal movement (tramming) and ranging arm movement.

In order to limit damage to the cutting machine 26, this disclosure provides a method of limiting accidental contact of the mining head 34 with the mine floor or other parts of the longwall system (not shown). The method is implemented in software in the machine controller 52, and utilizes the flow charts shown in FIGS. 4 to 9.

In summary, the undercut protection program 64, determines what is the undercut limit for a particular machine on a particular mine face, which is a value initially set by the machine operator. It then determines the position of a ranging arm with respect to the machine, by determining the ranging arm position relative to the machine, by determining the machine roll, and by determining the movement and direction of the machine. If the machine is leaving a gate end, and the position of the ranging arm is below an undercut limit, stopping movement of the machine.

Roof shields 68 (shown schematically in FIG. 3) covering and protecting the longwall shearer 26 are aligned along the mine face. The number of shields is known, and the shields that are present near the gate ends of the longwall face are also known. The shields that are present between the run of face and the gate ends are also known, and define where the gate ends begin and the run of face ends, and vice versa.

Figure 2:
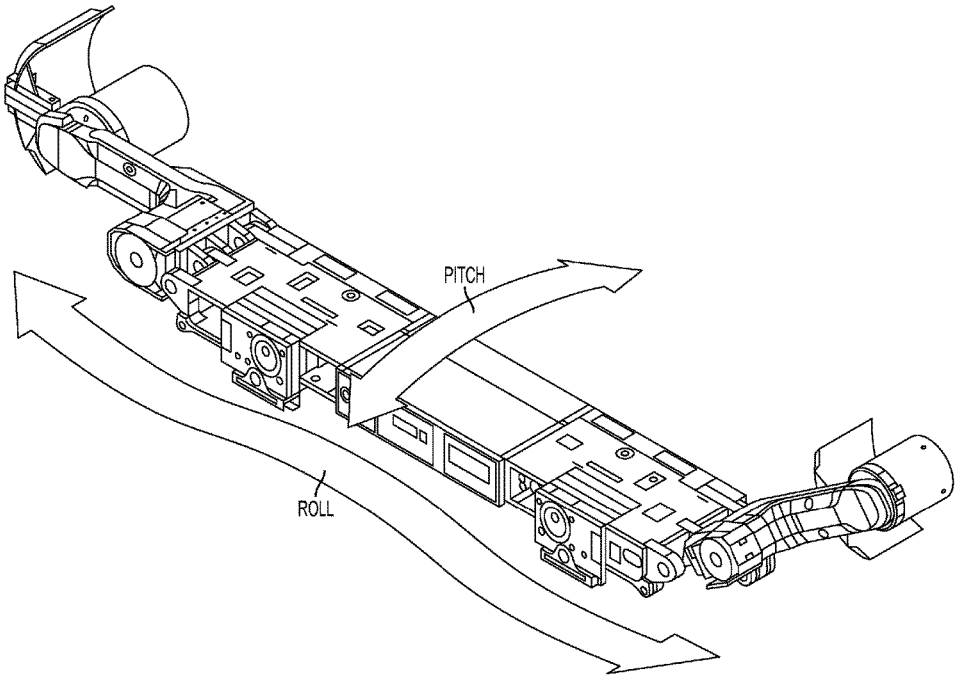
FIG. 2 is a perspective view of the shearer shown in FIG. 1, with arrows indicating the roll and pitch of the machine, as well as the position of the ranging arm relative to the machine.

More particularly, the mining machine 26 includes a plurality of sensor means mounted on the machine and adapted to measure different parameters of the mining operation and to generate electrical signals representative of said parameters. A first of said sensor means, which is an inclinometer 56 mounted at the pivot point of each of the ranging arms 42, is arranged to measure the positions of each of said arms with respect to the machine 26, and a second sensor means, which is a sensor 55 mounted on the shearer drive gears, is arranged to measure the movement and direction of the machine 26. A third of said sensor means, which is a pitch and roll sensor 54, is arranged to measure the pitch and the roll (see FIG. 2) of the machine 26 along the mineral face being cut. If desired, the machine pitch can also be taken into consideration (not shown) when determining the ranging arm position relative to the mine floor.

Still more particularly, the method comprises the steps of establishing from the first and second sensor means, the electrical signals indicating the direction of movement of the machine and the position of the machine relative to the mineral face, and electrical signals indicating the position of the ranging arm relative to the machine, and processing in the machine controller the electrical signals to determine if the machine is leaving a gate end, and if the position of the ranging arm is below an undercut limit, stopping movement of the machine.

Figure 3:
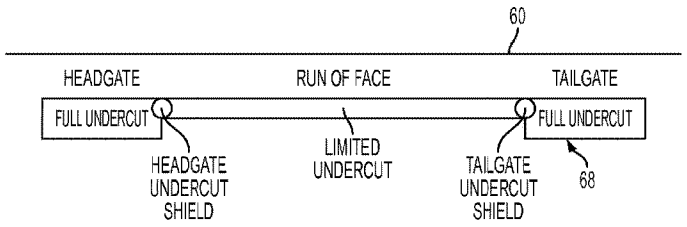
FIG. 3 is a schematic illustration of the longwall face.
Figure 4:
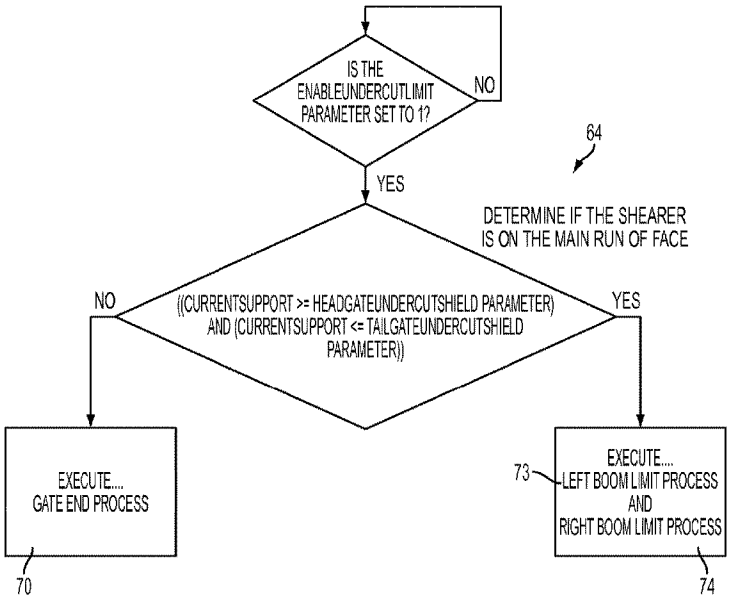
FIG. 4 is a flowchart showing the undercut protection program 64.
Figure 5:
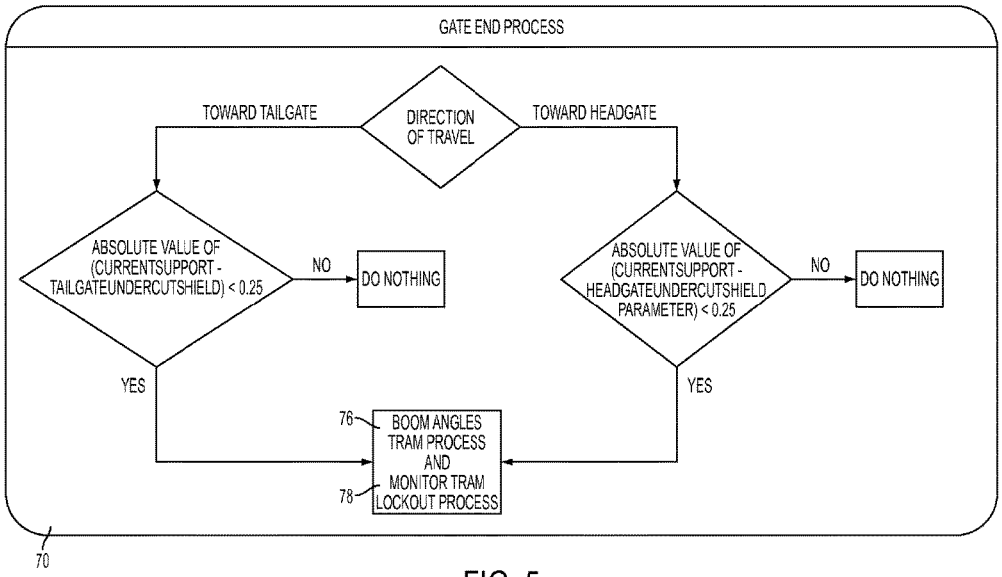
FIG. 5 is a flow chart of the gate end process 70 shown in FIG. 4.
Figure 6:
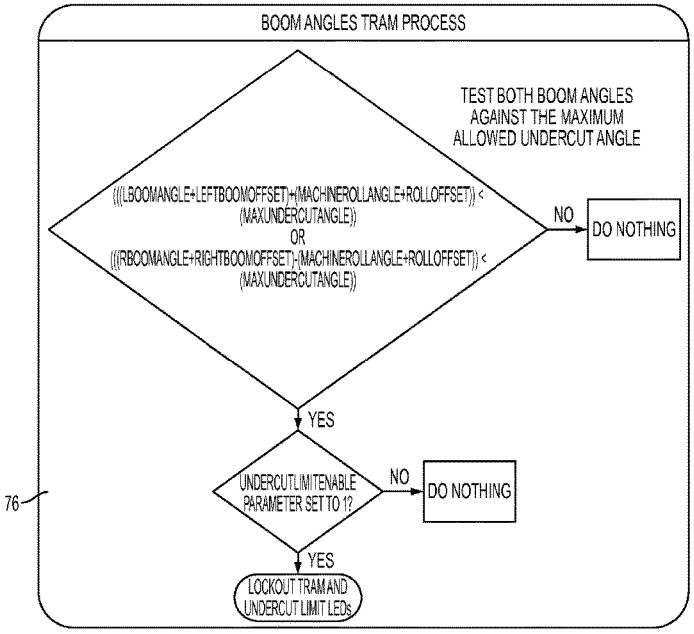
FIG. 6 is a flow chart of the boom angles tram process 76 shown in FIG. 5.
Figure 7:
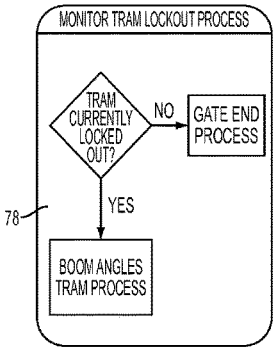
FIG. 7 is a flow chart of the monitor tram lockout process 78 shown in FIG. 5.
Figure 8:
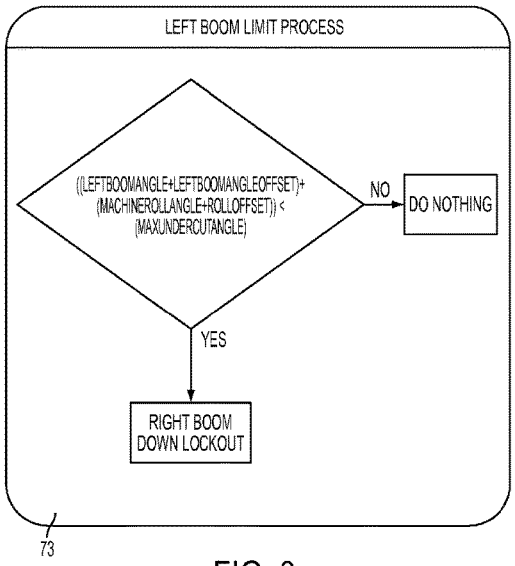
FIG. 8 is a flow chart of the left boom limit process 73 shown in FIG. 7.
Figure 9:
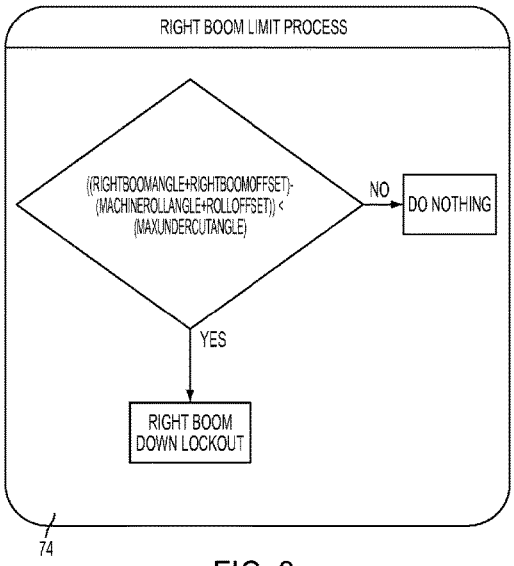
FIG. 9 is a flow chart of the right boom limit process 74 shown in FIG. 7.

FIGS. 4 through 9 depict in greater detail the particulars of the undercut protection program of this disclosure. More particularly, setting an initial parameter to one initially starts the undercut protection program 64. When this parameter is set, the program operates to determine if the shearer is on the run of face. This is done by comparing the current roof shield number with the shield numbers present at the gate ends of the face (CurrentSupport>=HeadgateUndercutShield), as shown in FIG. 3. If the shearer 26 is on the run of face, then the program limits the ranging arm or boom going beneath the undercut limit by executing a left boom limit process 73 and a right boom limit process 74. If the shearer is not on the run of face, then the program executes the gate end process 70.

When the program 64 executes the gate end process 70, the program first looks to see which direction the shearer is going. If the shearer 26 is leaving a gate end, as determined by looking at the number of the particular roof support shield, then a boom angles tram process 76 and monitor tram lockout process 78 is engaged. The boom angles tram process 76 is executed first, and looks to see the ranging arm position (LeftBoomAngle) taking into consideration initial offset value (LeftBoomOffset), as corrected by the machine roll (MachineRollAngle+RollOffSet). This value is then compared to the undercut limit (MaxUndercutAngle), and if the value is below that limit, then tramming or moving of the cutting machine is stopped. The program then executes the monitor tram lockout process, where the boom angle is again checked, until the boom angle is no longer under the undercut limit. If the boom angle is no longer under the undercut limit, the tram lockout is removed and the machine is then allowed to travel into the run of face.

If the software stops the machine, a message on the status screen of the shearer explains that the undercut limit has been exceeded. It is also to flash a light somewhere on the machine, but not all machine have a light. The machine will operate normally but will not resume tram until the ranging arm is raised to above the parameter limit. The alarm message is "tram disabled—ranging arm is below undercut limit." The help text is the control system has detected that the ranging arm has reached the undercut limit, while in the run of face. The maximum undercut angle is defined by a parameter.

The possible causes of the controller indicating an undercut situation are that the operator has lowered the ranging arm too far, or the ranging arm inclinometer is out of calibration, or the pitch/roll sensor is out of calibration.

Various other features of this disclosure are set forth in the following claims.

The invention claimed is:

1. A method of steering a trailing drum of a double-ended mining machine in which the mining machine is of the kind having a body arranged to be progressed along a mineral face being cut, the body having at each end a ranging arm pivotally mounted on the body and each arm carrying a rotatable cutting drum, a plurality of sensors being mounted on the machine and being adapted to measure different parameters of the mining operation and to generate signals representative of said parameters, a first of said sensors being arranged to measure the positions of each of said arms with respect to the machine, a second of said sensors being arranged to measure the movement and direction of the machine, a third of said sensors being arranged to measure a roll of the machine along the mineral face, the method comprising the steps of:

establishing from the first and second sensors, signals indicating the direction of movement of the machine and the position of the machine relative to the mineral face, and signals indicating the position of the ranging arm relative to a mine floor, establishing from the third sensor, signals indicating the roll of the machine, processing the signals to determine if the machine is leaving a gate end of the mineral face in a direction towards an opposite gate end of the mineral face, determining a current position of at least one ranging arm, comparing the current position of the ranging arm with an undercut limit defined along the mineral face, and

[stopping] *preventing* movement of the ranging arm *from the gate end* when the current position of the ranging arm is below the undercut limit.

2. A method according to claim [1] *5* wherein movement of the machine resumes when the ranging arm is no longer below the undercut limit.

3. A method according to claim [1] *5* wherein movement of the ranging arm is stopped when *the* ranging arm reaches the undercut limit *and* when the mining machine is at *a position* other than [a] *the* gate end *and the opposite gate end*.

4. A method of steering a trailing drum of a double-ended mining machine in which the mining machine is of the kind having a body arranged to be progressed along a mineral face being cut, the body having at each end a ranging arm pivotally mounted on the body and each arm carrying a rotatable cutting drum, a plurality of sensors being mounted on the machine and being adapted to measure different parameters of the mining operation and to generate signals representative of said parameters, a first of said sensors being arranged to measure the positions of each of said arms with respect to the machine, a second of said sensors being arranged to measure the movement and direction of the machine, a third of said sensors being arranged to measure a roll of the machine along the mineral face, the method comprising the steps of:

establishing from the first and second sensors, signals indicating the direction of movement of the machine and the position of the machine relative to the mineral face, and signals indicating the position of the ranging arm relative to a mine floor, establishing from the third sensor, signals indicating the roll of the machine, processing the signals to determine if the machine is leaving a gate end of the mineral face in a direction towards an opposite gate end of the mineral face, determining a current position of at least one ranging arm, comparing the current position of the ranging arm with an undercut limit defined along the mineral face,

[stopping] *preventing* movement of the ranging arm *from the gate end* when the current position of the ranging arm is below the undercut limit, resuming movement of the machine when the ranging arm is no longer below the undercut limit, and continuously determining the current position of [at least one] *the* ranging arm when the mining machine is moving along the mineral face at a position other than [a] *the* gate end *and the opposite gate end*, and stopping movement of the ranging arm when the current position of the ranging arm [is below] *reaches* the undercut limit.

*5. A method according to claim 1 wherein movement of the ranging arm from the gate end is prevented by stopping the machine from leaving the gate end in the direction towards the opposite gate end when the current position of the ranging arm is below the undercut limit.*

*6. A method according to claim 4 wherein the movement of the ranging arm from the gate end is prevented by stopping the machine from leaving the gate end in the direction towards the opposite gate end when the current position of the ranging arm is below the undercut limit.*

* * * * *